US011962724B2

(12) United States Patent
Schoedinger et al.

(10) Patent No.: US 11,962,724 B2
(45) Date of Patent: Apr. 16, 2024

(54) IMAGING DOCUMENTS WITH MEDIA BUNDLED AND USED IN PACKAGING MATERIALS

(71) Applicant: LEXMARK INTERNATIONAL, INC., Lexington, KY (US)

(72) Inventors: Kevin Dean Schoedinger, Lexington, KY (US); Edward Lynn Triplett, Lexington, KY (US); Scott Allan Kendall, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 539 days.

(21) Appl. No.: 17/130,660

(22) Filed: Dec. 22, 2020

(65) Prior Publication Data

US 2022/0201132 A1 Jun. 23, 2022

(51) Int. Cl.
*H04N 1/00* (2006.01)
*G03G 15/00* (2006.01)
(Continued)

(52) U.S. Cl.
CPC ....... *H04N 1/00106* (2013.01); *G03G 15/553* (2013.01); *G06Q 10/06311* (2013.01);
(Continued)

(58) Field of Classification Search
CPC ........... H04N 1/00106; H04N 1/00188; H04N 1/034; G03G 15/553; G06Q 10/06311; G06Q 10/20; G06Q 30/0283
See application file for complete search history.

(56) References Cited

U.S. PATENT DOCUMENTS 4,733,310 A * 3/1988 Kapp ................. G03G 15/6502
358/300
5,794,928 A * 8/1998 Araseki .................... B65H 1/14
271/157
(Continued)

FOREIGN PATENT DOCUMENTS

CN 100403178 C * 7/2008 ......... G03G 15/6552
CN 101231489 A * 7/2008 ............ B41J 11/006
(Continued)

OTHER PUBLICATIONS

Hamidul Islam, "Life cycle assessment of shipping container home: A sustainable construction", Jul. 5, 2016, Energy and Buildings 128 (2016), pp. 673-685. (Year: 2016).*
(Continued)

*Primary Examiner* — Tan D Nguyen

(57) ABSTRACT

A business method includes imaging documents with an imaging device placed at a location. Media usage is monitored over a cellular network. Upon the media reaching a predetermined level, workers provide additional media. Workers exist in the "gig" economy and have preplaced media. No longer do users change or swap media in media trays. Packaging materials bundle the media. For use, only a portion of the packaging materials is opened thereby revealing an end of the media. Both the packaging materials and the exposed media are inserted into a reusable media shell in a manner making the media available for picking by the imaging device. Other embodiments are envisioned.

8 Claims, 4 Drawing Sheets

(51) Int. Cl.
    *G06Q 10/0631*     (2023.01)
    *G06Q 10/20*     (2023.01)
    *G06Q 30/0283*     (2023.01)
    *H04N 1/034*     (2006.01)

(52) U.S. Cl.
    CPC ......... *G06Q 10/20* (2013.01); *G06Q 30/0283* (2013.01); *H04N 1/00188* (2013.01); *H04N 1/034* (2013.01)

(56) References Cited

U.S. PATENT DOCUMENTS

| | | | | |
|---|---|---|---|---|
| 7,063,399 | B2* | 6/2006 | Eade | B41J 29/393 |
| | | | | 347/7 |
| 2004/0177373 | A1* | 9/2004 | Kawabe | H04N 21/64707 |
| | | | | 348/E7.086 |
| 2006/0191426 | A1* | 8/2006 | Timmerman | B26F 1/38 |
| | | | | 101/24 |
| 2012/0242038 | A1* | 9/2012 | Yatsunami | B65H 7/06 |
| | | | | 271/265.01 |
| 2017/0081139 | A1* | 3/2017 | Yaginuma | B65H 1/04 |
| 2022/0198231 | A1* | 6/2022 | Schoedinger | G06Q 10/087 |
| 2022/0299910 | A1* | 9/2022 | Triplett | B65H 1/027 |

FOREIGN PATENT DOCUMENTS

| | | | | |
|---|---|---|---|---|
| CN | 100423530 C | * | 10/2008 | ......... H04N 1/00281 |
| WO | WO-9621613 A1 | * | 7/1996 | ............. B65H 29/51 |
| WO | WO-9728972 A1 | * | 8/1997 | ............. B43M 5/042 |
| WO | WO-2004108428 A2 | * | 12/2004 | ............. B26D 11/00 |

OTHER PUBLICATIONS

Patrick Kaifosh, "SIMA: Python software for analysis of dynamic fluorescene imaging data," 2014, Frontiers in Neusoinformatics, vol. 8, Article 80, pp. 1-10. (Year: 2014).*

Milos Vorkapic, "Implementation of 6R Strategy in FDM Printing Process: Case-Small Electronic Enclosure Box," 2020, Journal of Engineering Management and Competitiveness (JEMC), vol. 10, No. 2, pp. 141-150. (Year: 2020).*

Christopher Varnier, "Scheduling Predictive Maintenance in Flow-Shop," 2012, IEEE, pp. 1-6. (Year: 2012).*

* cited by examiner

IMAGING DOCUMENTS WITH MEDIA BUNDLED AND USED IN PACKAGING MATERIALS

FIELD OF THE INVENTION

The present disclosure relates to reimagining printing with a minimally viable imaging device operated under new market conditions. It relates further to business methods of imaging documents, including strategies for financing, working in a temporary or "gig" economy, ecologically sustaining operations, utilizing cellular technology and networks, and encouraging social distancing during times of healthcare uncertainties, to name a few.

BACKGROUND

Traditional methods of printing documents involve selling or placing imaging devices with entities, such as stores, offices, businesses, etc. Future sales of toner and ink cartridges recoup the manufacturing and placement cost of the imaging devices and add profit thereafter (known often as a 'razor and blades' business model). Similarly, selling media pages adds to the profitability of imaging devices. Some entities are reevaluating present business models in light of current market conditions involving a general decline in printing exacerbated by work-from-home environments during the COVID pandemic. The inventors recognize a need to overcome problems associated with prior art business models.

SUMMARY

The foregoing and other issues are solved with business methods placing imaging devices at venues, as is traditional. However, toner usage is monitored in the imaging device over a persistent connection by way of a cellular network, such as 5G, 4G, LTE, or other. Upon the toner level reaching a predetermined low level, the entire imaging device is collected from the location and replaced with another imaging device having a toner lever above the low level. Workers in the gig economy swap the devices. No longer do users change or swap empty toner cartridges with full or fresh toner cartridges. Rather, an entire, empty imaging device is replaced with another, full imaging device. Access to the toner by users is largely prevented. Empty imaging devices are refilled with toner, inspected, certified and made ready for redeployment as full imaging devices. Media usage in the imaging device is also monitored over the cellular network and gig workers also deliver additional media to the location as needed.

Preplacement of pluralities of certified imaging devices and media with gig workers or other parties is also envisioned. Preventing or limiting connection of the imaging device to computing networks other than a cellular network is envisioned as it facilitates ease of usage and immediate installation for use at a location. Imaging requests from users are received over the cellular network upon payment. Payment is split between an entity owning or renting the imaging device and an entity where the imaging device is located. Unique lighting schemes notify users of their imaging requests. Schemes include but are not limited to the use of lighting colors, flashing/steady patterns of lights, timing, etc. Lighting schemes also encourage social distancing between users. That is, users only approach the imaging device to retrieve their hard copies upon the imaging device displaying the assigned lighting scheme. Delays between imaging requests further facilitates distance between users.

Imaging devices incorporate architectural elements avoiding user operated doors and access panels as users will no longer remove empty toner or ink cartridges and replace them with full cartridges. No longer are cartridges required at all, much less removable ones. Smart chips and other electronics on cartridges now no longer need to serve as authentication devices and/or track low or full conditions of toner or ink. Monitoring of toner and ink occurs over a cellular network as does monitoring of media usage. Little or no electronics are needed for communication with an ASIC of the imaging device.

Minimally viable imaging devices also eliminate the need for cooling fans, vents, special settings, and user interfaces. Each of which contributes to simplified manufacturing, shipping, replacement, and refurbishment. They also make for cleaner devices as users no longer need to touch devices other than, perhaps, to retrieve printouts. Imaging devices will also likely only facilitate one size of media, e.g., letter size 8.5"×11", thus eliminating media trays and allowing media handling and electrophotographic imaging operations to be optimized therefor. Imaging occurs in simplex mode only, thus avoiding software and hardware control for duplexing. Designing media to remain in packaging materials provides an easier and more robust user experience. To ready media for use, only a portion of the packaging materials is opened, thereby revealing but a single end of the media. Both the packaging materials and the exposed media are inserted into a reusable media shell in a manner making the media available for picking by the imaging device. The packaging may include features such as perforations, pull tabs, last-sheet restraint function, and/or lift plate. Workers in the gig economy have preplaced media. Upon the media reaching a predetermined level, workers provide additional media. No longer do users change or swap media in media trays. Media usage is monitored over the cellular network.

Empty imaging devices are harvested to reclaim unused toner or ink. Aggregations of unused toner or ink from many such devices facilitate ecologic sustainability as it becomes used along with fresh toner or ink to refill empty imaging devices. The process repeats. Still further embodiments are contemplated.

DETAILED DESCRIPTION

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, imaging devices are described for imaging documents under a new paradigm.

Figure 1:
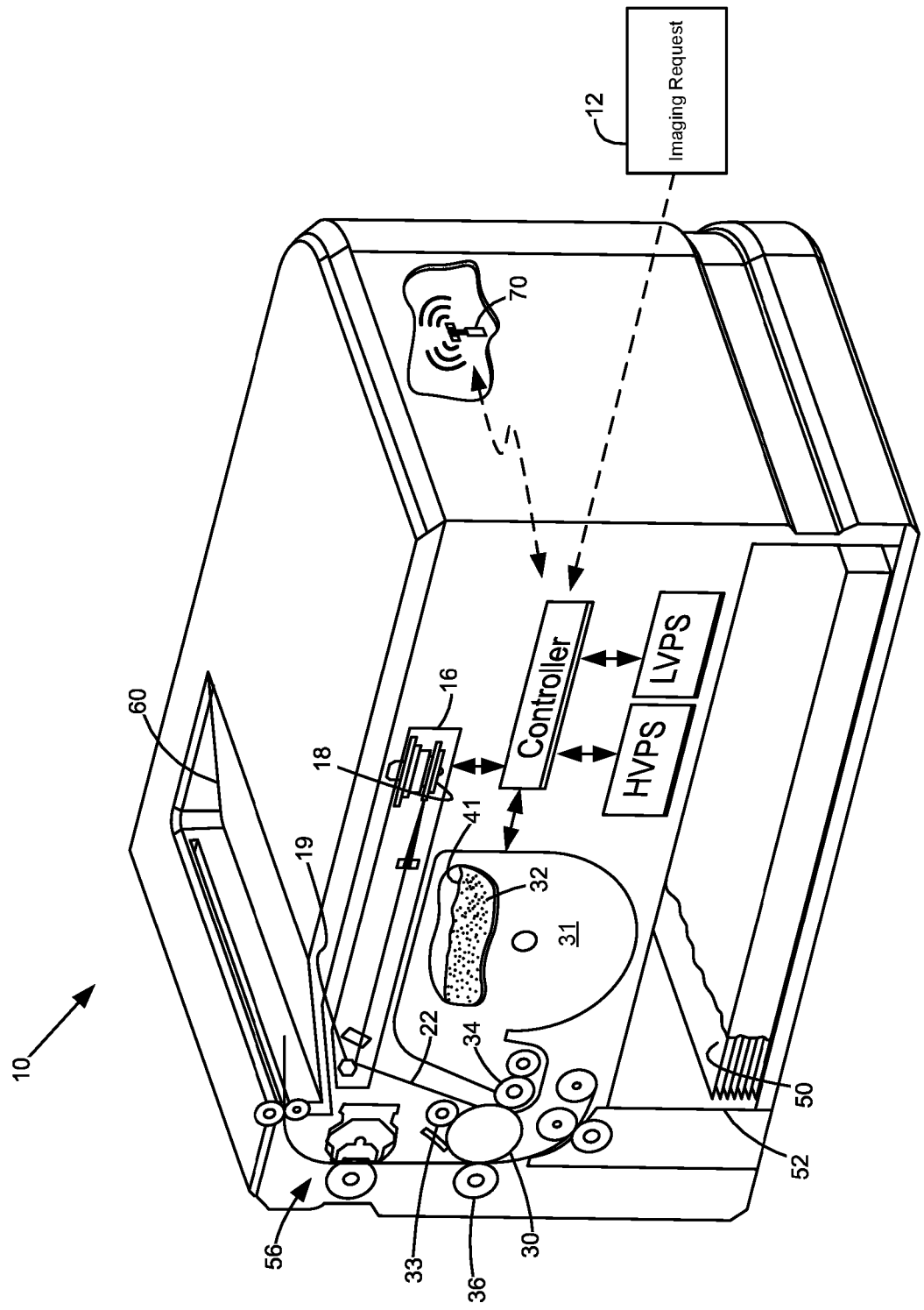
FIG. 1 is a diagrammatic view of an imaging device for imaging documents, including an internal schematic view revealing architectural components of a minimally viable imaging device facilitating the electrophotographic imaging of sheets of media.

FIG. 1 teaches an imaging device 10 for imaging documents. The device is described as an electrophotographic printer having a supply of toner, but could be an inkjet printer, copier, fax machine, all-in-one, or other similar device having supplies of ink and/or toner. It is also described as monochromatic, e.g., black only (shown), but could be color-imaging capable (not shown). In any, the device receives at a controller an imaging request 12 for imaging media 50. The controller typifies an ASIC(s), circuit(s), microprocessor(s), firmware, software, or the like. The request comes from external to the imaging device, such as from a computer, laptop, smart phone, cloud service, etc. The controller converts the request to appropriate signals for providing to a laser scan unit (LSU) 16. The unit turns on and off a laser 18 according to pixels of the imaging request. A rotating mirror 19 and associated lenses, reflectors, etc. focus a laser beam 22 onto a photoconductive (PC) drum 30. The drum corresponds to a supply item 31 of toner 32. The supply is a large capacity container and is expected to image at least 30,000 sheets of media before reaching a toner-low level. A charge roll 33 sets a charge on a surface of the drum 30 as the drum rotates. The laser beam 22 electrostatically discharges the drum to create a latent image. A developer roll 34 introduces toner from the supply 32 to the latent image and such is electrostatically attracted to create a toned image on a surface of the drum. A voltage differential between the surface of the drum 30 and an opposed transfer roll 36 transfers the toned image direct from the drum to a sheet of media 50 or indirect to an intermediate transfer member (not shown) for subsequent transfer to the media. The sheet advances from a reusable media shell 52 to a fuser assembly 56 to fix the toned image to the media through application of heat and pressure. Users pick up the media from a bin 60 after it advances out of the imaging device. The controller coordinates the operational conditions that facilitate the timing of the image transfer and transportation of the media from shell to output bin. The controller also coordinates with one or more high and low voltage power supplies (HVPS, LVPS) to set the relative voltages for the electrophotographic image process, including setting the voltages for the charge roll 33, the developer roll 34 and transfer roll 36.

The imaging device further includes an antenna 70. The antenna is tuned to operate in a cellular network. The antenna coordinates with the controller. The controller assesses a level 41 of toner in the supply 32. The toner level can be broadcast over the antenna. Similarly, the controller counts sheets of media 50 imaged in the imaging device. The number can be broadcast or accessed by the antenna over the cellular network.

Figure 2:
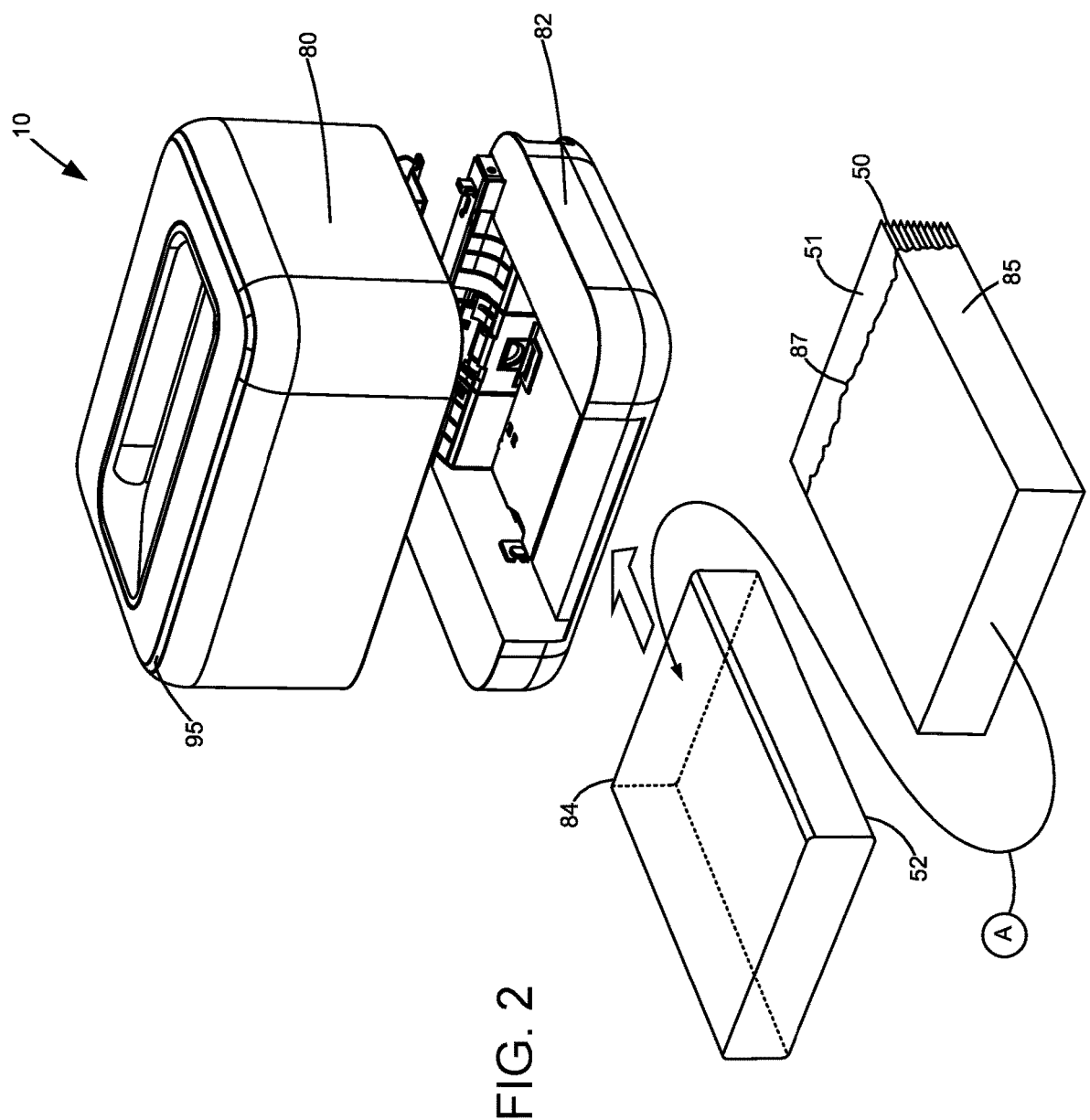
FIG. 2 is an exploded view of a representative imaging device indicating its modularity, media usage, and lighting.

That the imaging device is a minimally viable imaging device, there exists no vents, no fans, no user adjustments, no user interface, no special settings for installation. There exists a very short paper path length from the shell 52 to output bin 60. As seen in FIG. 2, the imaging device may also include a modular assembly with stackable components 80, 82 into which the shell 52 inserts. In turn, media sheets fit into the shell and can remain in their packaging materials 85. They need only be exposed at end 84 where they can be picked. A perforation, pull tab, or other can be provided to facilitate this action. Tearing off or opening an end 87 of the materials 85 exposes the media at 51, but not an entirety of the packaging materials are removed from the media. Rather, most of the packaging materials remain about the media and only the end 84 of the media is made available for picking by the imaging device. Following arrow "A" reveals how the media and packaging materials are inserted into the shell. That is, the unopened end of the packaging materials inserts first into the shell and the open end 87 inserts second and interfaces with module 82. The shell fits only one size of media, such as 8.5"×11" letter paper size. However, the shell is sized and shaped as a rectangular solid to mimic the size and shape of the packaging materials of the media, but needs to have a size revealing access of the media to the imaging device. The packaging materials and the media are recycled paper products. The materials for the shell, as well as the materials for the imaging device, contemplate reusable plastics, where possible, and flame-retardant materials. Lastly, the imaging device 10 includes one or more color or monochromatic lights 95 that can be used to signal various imaging schemes to a user corresponding to imaging requests, as described below. The lights can extend around a periphery of the imaging device as shown or be placed anywhere.

Figure 3:
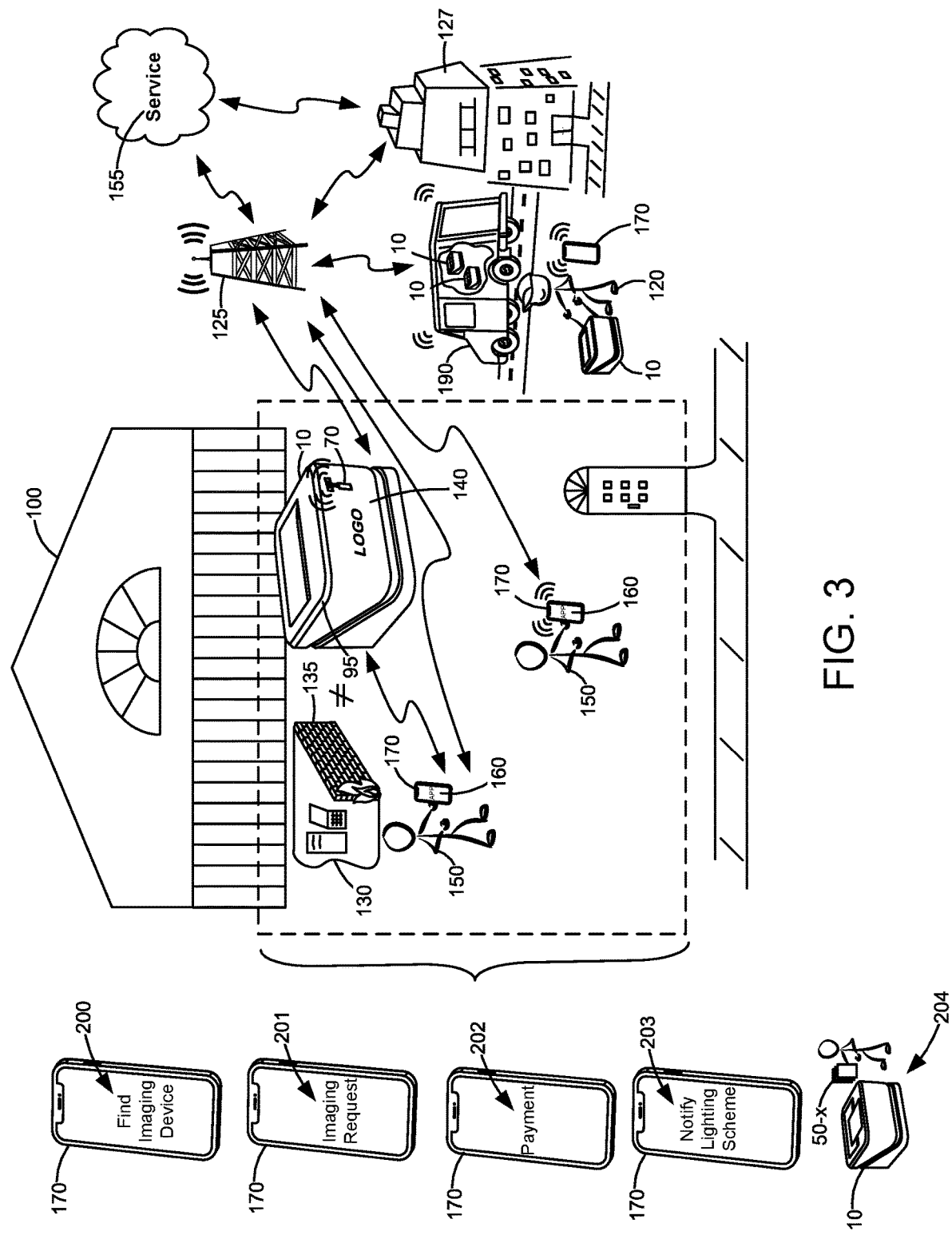
FIG. 3 is a diagrammatic view of a computing system environment for imaging documents.

With reference to FIG. 3, the imaging device 10 gets placed at a venue or location 100. Workers 120 or parties in a temporary or "gig" economy place the device. They ideally have pluralities of imaging devices 10 for placement. The workers may also collect spent or used imaging devices. Upon placement, the imaging device connects via a cellular network 125 by way of the antenna 70. An entity 127 owning or renting-out the imaging device monitors over the cellular network the level of toner or ink in the imaging device and usage of media. Ideally, the imaging device is prevented from connecting to a computing network 130 of the venue, especially prevented from connecting behind a firewall 135 of the computing network. This minimizes complications during computing installation. Rather, the imaging device is ready for operation upon powering up by connecting to an AC power outlet.

Between a business of the venue 100 and the entity 127 owning or renting the imaging device, there are numerous remuneration schemes contemplated by the business methods herein. Preferably, they are defined according to terms of a written contract. In a first scheme, the venue pays to the entity a calendar subscription fee, such as $50/month. The fee can be based on usage of a predetermined amount of media or an amount of toner or ink, for example. The fee can be fixed or ballooning/collapsing. The fee may be also a flat fee regardless of usage. In a second scheme, if media usage or toner or ink usage exceeds a predetermined level, there may exist no fee at all. Rather, payments from users 150 of the imaging device may be split between the entity 127 and the venue 100. The split can be according to a percentage, according to calendar schemes, both, or other. The split in payment may also combine with the subscription fee. Branded logos 140 may further define a source of revenue for either the entity 127 or venue 100. The logo revenue would work as is traditional in advertising.

In any scheme, users 150 interact with the imaging device 10 by way of the cellular network 125. That is, users engage a service provider 155 of mobile applications (colloquially "mobile 'apps'"). The provider makes available applications 160 that users download onto a mobile computing device, such as a smart phone 170. As is typical, users execute a series of functions on their mobile device and obtain the requisite code of the app by way of the attendant network.

The network includes or not a variety of software such as an "app store" and hardware such as routers, servers, switches, desktop/laptop computers, phone transmission towers, satellites, etc. The connections typify wired and wireless communications between a few or many devices in an internet, intranet or other environment. Skilled artisans readily understand the process and the requisite actions for downloading applications.

Upon installation of the application 160, users engage the imaging device 10 for processing imaging requests and obtaining hard copy outputs thereof. In a first instance, users engage their app to find a location 200 of nearby imaging devices if they do not already know the whereabouts of such devices. This includes among other things providing written instructions to locate the imaging device and/or providing a map for display on a screen of the mobile device. At 201, users engage the app to select a file, a photo, a screenshot, a document, etc. for printing on the imaging device. The users pay for the imaging request at 202. The payment can be a fixed fee for a number of pages of media, for example. Alternatively, the payment can be a monthly or other calendar fee as part of a subscription service. Other payments are possible. In any, the payment can include processing by the service provider 155 and/or other well-known or lesser known payment providers, such as Visa, Mastercard, Amex, PayPal, Venmo, Apple Wallet, Google Wallet, Android Pay, Cash App, etc. The payment can be split amongst all or some of the parties according to agreed contractual terms. The entity 127 and venue 100 will also likely split the payment according to agreed terms.

Once paid for, the imaging request 12 (FIG. 1) gets sent to the imaging device for processing. The users 150 are notified on their mobile device 170 of a unique lighting scheme 203. The unique lighting scheme can be a visual representation on their smart phone or textual, or both. The unique lighting scheme will be reproduced by the one or more lights 95 of the imaging device and such will indicate to the user the processing of their imaging request. As an example, one user may be notified that the imaging device will process their imaging request by flashing green lights while another user is notified that their imaging request corresponds to solid blue lights. Other schemes are possible. There may be also a time stamp of delivery provided to the user for a time to retrieve their hard copy output 50-x from the bin of the imaging device 10 as at 204. Other users will engage the imaging device similarly.

Figure 4D:
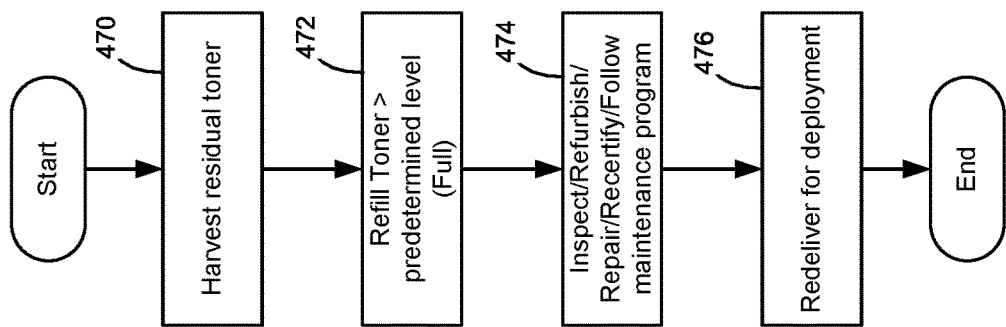
FIGS. 4A, 4B, 4C, and 4D are flow diagrams for imaging documents contemplative of monitoring supply and media usage over a cellular network, utilizing gig economy workers, and employing environmental sustainability practices under modern market conditions.
Figure 4C:
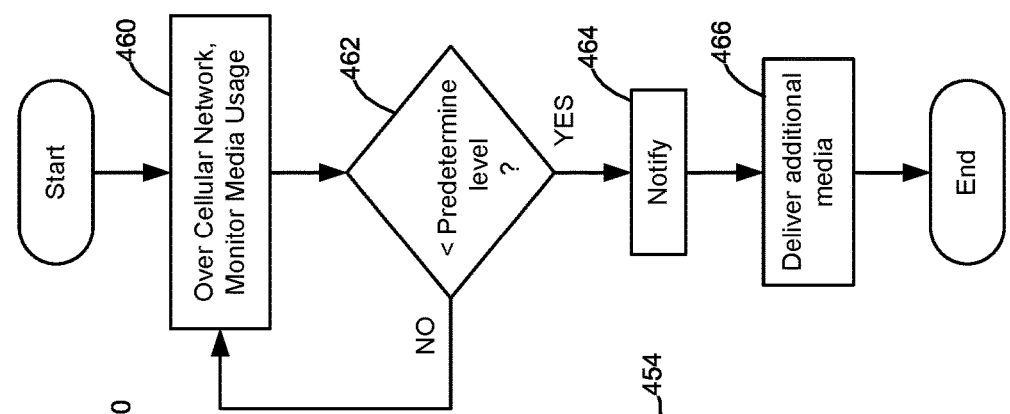
Figure 4B:
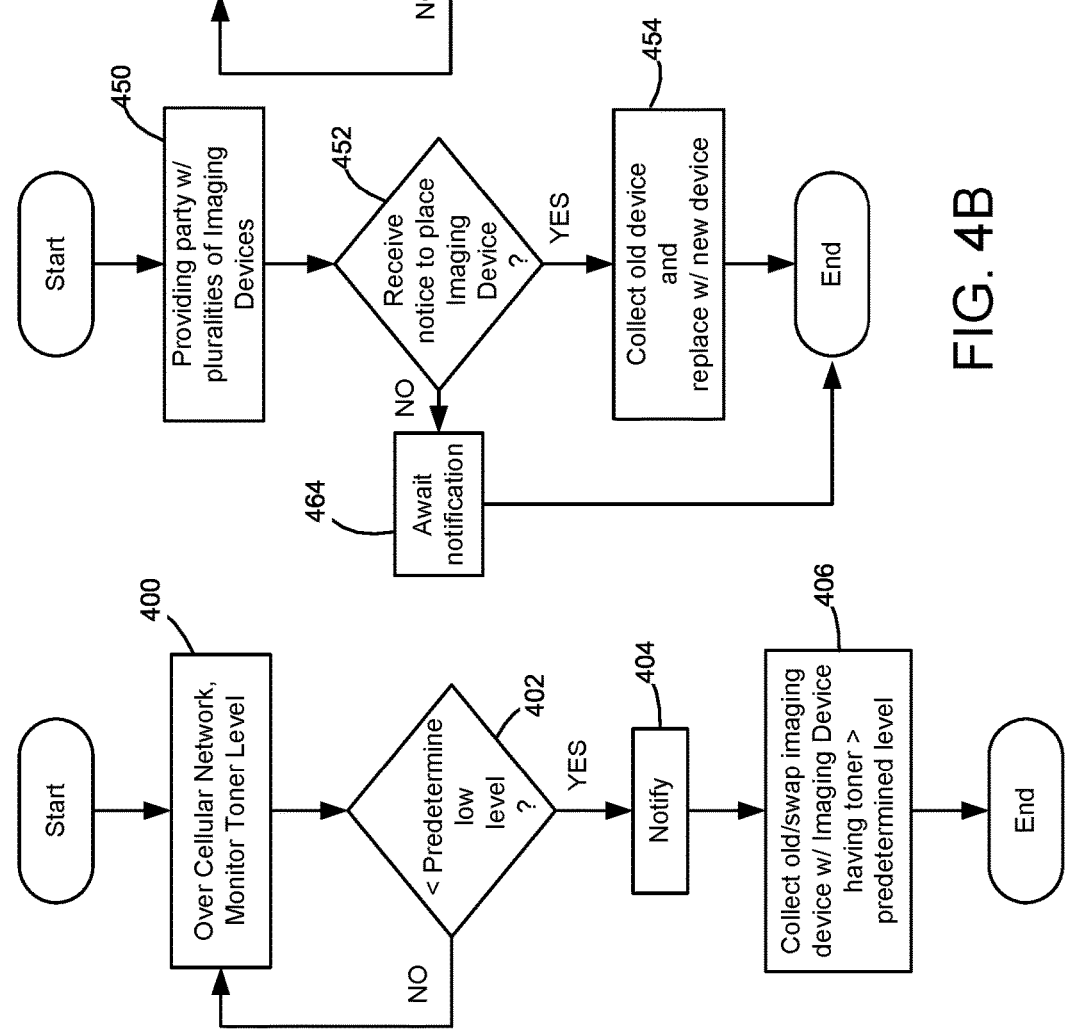
Figure 4A:
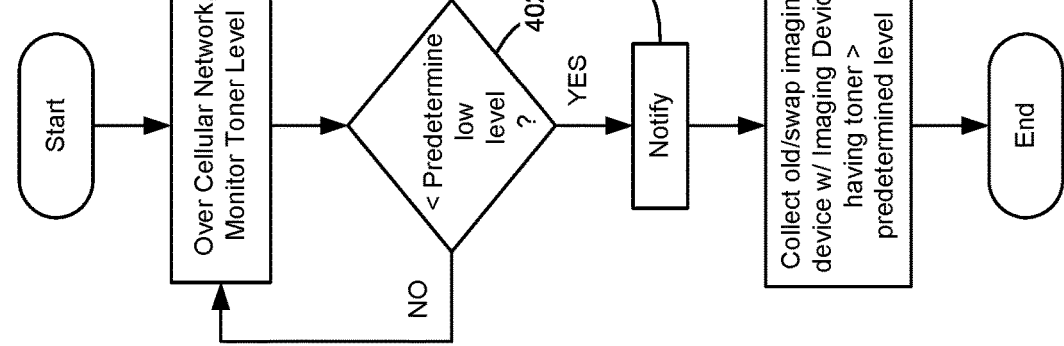

With reference to the flowcharts of FIGS. 4A, 4B, 4C, and 4D, further aspects of the methods herein include combined reference to the flowcharts and the diagram of FIG. 3. In FIG. 4A, the entity 127 owning or renting the imaging device monitors a level of the toner in the imaging device 10 over the cellular network, 400. This includes some or all of querying and broadcasting the toner level over the antenna 70 of the imaging device as controlled by the controller. If the toner level is greater than a predetermined low level at 402, monitoring continues at 400 until such time as the toner level falls beneath or is less than the predetermined low level at 402. Times of monitoring occurs according to a schedule, such as hourly, daily, weekly, etc. Times can also occur more frequently or randomly. Any monitoring is possible. The predetermined level of toner may be also any of a variety. It can be based on a number of pages available left to be imaged, a weight of toner in the imaging device, a volume or height level of toner in the supply, a volume or height level of toner in a waste toner container, etc. Once the toner falls beneath the low level, however, a communication is initiated to notify 404 a worker 120 to visit the venue 100 and collect the empty or spent imaging device. The worker then replaces the imaging device with another, whole imaging device having a full toner level or a level at least above the predetermined low level, 406.

At FIG. 4B, the worker 120 may have been already supplied with a plurality of ready-to-place imaging devices, 450, such as carried in a delivery vehicle 190. The worker receives notification to swap spent imaging devices with full or fresh imaging devices at 452, such as by way of a text, email, phone call or the like on their mobile computing device 170 or another device. This notice may also include a time and date for collection and replacement. Regardless, once notified, the worker collects the old imaging device and swaps it with a new imaging device, 454. Else, the worker awaits notification at 456. The worker may be a temporary worker in the gig economy, such as a worker for DoorDash, Lyft, Uber, Grubhub, Instacart, or other similar delivery service. Alternatively, they may be workers associated with or employed by the entity 127 or venue 100. They may be contract workers not assigned elsewhere. They can belong to the service provider 155 as well, or other. Many schemes are possible.

Similarly, media usage of the imaging device is monitored over the cellular network at 460, FIG. 4C. The monitoring occurs according to the schedules of monitoring the toner or at other or similar times. Upon the media usage reaching less than a predetermined level, 462, workers are notified 464 to replenish the media 466. The predetermined level may correspond to pages of media sheets, numbers of packages of media, numbers of pallets or other bundles of media, or the like. Weight and/or volume monitoring of the media is also contemplated. If, however, the media usage has not fallen beneath the predetermined level at 462, monitoring media usage continues over the cellular network. The controller coordinates with the antenna 70 of the imaging device to receive and reply to queries about media usage or to broadcast same. Any scheme is possible.

In FIG. 4D, once an imaging device is collected, such as at times pursuant to toner falling beneath the predetermined level (FIG. 4A), or because of maintenance or other issues, the collected imaging device is delivered to a destination where any and all of its residual toner can be harvested, 470. This includes opening the imaging device, such as by removing screws or other fasteners to reveal an interior of the imaging device. Next, the harvested toner is collected and aggregated with other toner to make full supplies of toner for refilling imaging devices back to a full condition above the predetermined low level, 472. The harvested toner may reside within waste bottles in or separate from the supply of toner 32 (FIG. 1). At 474, the imaging device may be also subject to inspection at this or other destinations. The inspections can include refurbishment or repair of existing components of the imaging device, such as those described in FIG. 1. It may also include replacement of components. The inspections can occur at times pursuant to a maintenance program or on an as-needed basis. Maintenance programs can be set forth in schedules, such as replacing fusers per every 250,000 sheets of media being imaged, changing waste toner bottles per every 30,000 sheets of media being imaged, or the like. Similarly, motors, pick mechanisms, PC drums, etc. can be inspected and/or replaced. Thereafter, the earlier-collected imaging device is recertified and readied or redelivered for deployment with a worker, 476. The process repeats.

The foregoing illustrates various aspects of the present disclosure. It is not intended to be exhaustive. Rather, it is chosen to describe the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A business method for imaging media with an imaging device having a reusable media shell, comprising:
    placing the imaging device at a location;
    delivering the media to the location, the media being bundled in packaging materials;
    opening only a portion of the packaging materials but not an entirety thereby keeping most of the packaging materials about the media but revealing an end of the media;
    inserting into the shell both the opened packaging materials and the media, the end of the media being made available for picking by the imaging device;
    picking the media by the imaging device; and
    imaging the media by the imaging device.

2. The business method of claim 1, further including monitoring over a cellular network media usage in the imaging device.

3. The business method of claim 2, further including dispatching a worker to deliver additional media for use in the imaging device upon a number of sheets of the media reaching a predetermined low level.

4. The business method of claim 2, further including dispatching a worker to deliver additional media for use in the imaging device upon a number of the packaging materials reaching a predetermined low level.

5. The business method of claim 2, further including charging a fee for the media usage.

6. The business method of claim 5, wherein the fee corresponds to a number of sheets of media.

7. The business method of claim 5, wherein the fee corresponds to a subscription service.

8. The business method of claim 1, further including collecting an entirety of the imaging device from the location and replacing the imaging device with a second imaging device having a toner level above the toner level in the collected imaging device.

* * * * *